US008862118B2

(12) United States Patent
Whidden

(10) Patent No.: US 8,862,118 B2
(45) Date of Patent: Oct. 14, 2014

(54) METHODS, APPARATUSES AND COMPUTER PROGRAM PRODUCTS FOR AUTOMATING TESTING OF DEVICES

(75) Inventor: Verne William Whidden, Poway, CA (US)

(73) Assignee: Nokia Corporation, Espoo (FI)

( * ) Notice: Subject to any disclaimer, the term of this patent is extended or adjusted under 35 U.S.C. 154(b) by 119 days.

(21) Appl. No.: 13/569,690

(22) Filed: Aug. 8, 2012

(65) Prior Publication Data

US 2014/0045483 A1 Feb. 13, 2014

(51) Int. Cl.
*H04M 3/00* (2006.01)
(52) U.S. Cl.
USPC ........................................................ 455/420
(58) Field of Classification Search
CPC .... G06F 3/0488; G06F 11/3664; H04M 1/24; H04W 24/00
USPC ........................................................ 455/420
See application file for complete search history.

(56) References Cited

U.S. PATENT DOCUMENTS

| | | | |
|---|---|---|---|
| 2004/0203467 A1* | 10/2004 | Liu et al. ..................... | 455/67.14 |
| 2005/0223360 A1* | 10/2005 | Seeman et al. ................ | 717/124 |
| 2006/0005132 A1* | 1/2006 | Herdeg, III .................... | 715/704 |
| 2006/0259629 A1* | 11/2006 | Usmani et al. ................ | 709/227 |
| 2008/0001923 A1* | 1/2008 | Hall et al. ...................... | 345/173 |
| 2009/0077422 A1* | 3/2009 | Khaladkar et al. ............... | 714/33 |
| 2009/0265689 A1* | 10/2009 | Gooi et al. ..................... | 717/125 |
| 2010/0095234 A1* | 4/2010 | Lane et al. .................... | 715/773 |
| 2011/0083042 A1* | 4/2011 | Chang et al. .................... | 714/31 |
| 2011/0310041 A1* | 12/2011 | Williams et al. ............... | 345/173 |
| 2012/0054715 A1* | 3/2012 | Welchman et al. ........... | 717/106 |
| 2012/0146956 A1* | 6/2012 | Jenkinson ..................... | 345/178 |

* cited by examiner

*Primary Examiner* — Nathan Mitchell
(74) *Attorney, Agent, or Firm* — Alston & Bird LLP

(57) ABSTRACT

An apparatus for facilitating automated testing of one or more communication devices may include a processor and memory storing executable computer code causing the apparatus to at least perform operations including capturing one or more recorded sequences of events in which at least one of the events corresponds to a detection of a touch input. The recorded sequences correspond to at least one designated test. The computer program code may further cause the apparatus to enable provision of the recorded sequences of events to one or more communication devices. The computer program code may further cause the apparatus to facilitate sending of one or more generated commands to at least one of the communication devices instructing the communication device to perform the recorded sequences. Corresponding methods and computer program products are also provided.

20 Claims, 5 Drawing Sheets

METHODS, APPARATUSES AND COMPUTER PROGRAM PRODUCTS FOR AUTOMATING TESTING OF DEVICES

TECHNOLOGICAL FIELD

An example embodiment of the invention relates generally to wireless communications technology and more particularly, relates to a method, apparatus, and computer program product for automating testing of communication devices.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to automated testing of communication devices. The automated testing may be performed to ensure that the communication devices operate properly. In this regard, a device manufacturer may ensure that a device(s) is behaving properly prior to being sold to consumers.

Currently, automated test systems utilized by cellular carriers and other manufacturers are typically based on a keyboard paradigm for navigation and simulated user input. These existing systems may, for example, send a test text message by using a sequence such as softkey (e.g., a "left softkey") to bring up an application list menu, and may use an arrow (e.g., "down arrow" key) to move down the list to a Short Message Service (SMS) application. The existing systems may then select a key (e.g., "select" key) to start the SMS application. At present, the existing test systems may then send messages to communication devices to simulate a user typing content of the message or performing some other test such as, for example, automatically dialing a telephone number, etc. Additionally, these existing test systems may utilize attention (AT) commands to implement modem functionality, but the testing may bypass a user interface of a communication device that the end user may interface with while using the communication device.

As described above, existing automated testing solutions may be based on a keypad paradigm in which there are typically a certain set of fixed keys for user content input, such as alphanumeric keys, keys for navigation such as arrow keys, and so called "soft" keys which typically represents some context sensitive action such as "accept", "decline", etcetera.

However, in communication devices utilizing touch input, there may be no way to send or "insert" simulated responses for graphical buttons like "accept", "decline", "send", or other actions or picture icons representing these graphical buttons or other actions. Furthermore, at present, a manner in which to navigate may be by touching an application icon to start an application or touching one of possibly several input boxes being displayed. Touching an input box, may activate the box for input and a graphical entry panel may appear which may be a list of pre-selected choices or it may be a context sensitive keypad. At present, the existing keypad paradigm utilized by test systems may have no way to navigate a landscape of a touch input screen or interface since the touch input screen may not have physical keypads. Additionally, existing solutions may not provide techniques for automating testing in a touch input environment which is independent of the operating system of communication devices or that is easily modifiable for touch input interfaces.

In view of the foregoing drawbacks, it may be beneficial to provide an efficient and reliable mechanism of automating testing of communication devices.

BRIEF SUMMARY

A method, apparatus and computer program product are therefore provided for facilitating automated testing of communication devices.

An example embodiment may capture one or more recorded sequences of events (e.g., touch events) on a communication device. The recorded sequences may be associated with one or more tests and may be included in one or more files. The files may be provided to other communications devices to enable the other communication devices to play or perform the recorded sequences of corresponding files to automatically test the communication devices according to the events of the recorded sequences.

In an example embodiment, the communications devices may perform or play one or more recorded sequences of one or more corresponding files in response to receiving one or more commands. In this manner, the tests may be implemented independent of the operating system of the communication devices. As such, an example embodiment may simplify creation and maintenance of test scripts for the communication devices. Simplifying creation and maintenance of test scripts according to an example embodiment may provide advantages associated with minimizing costs for test equipment and implementation and may provide a mechanism of more efficiently automating the performance of tests on communication devices utilizing touch inputs.

In one example embodiment, a method for facilitating automated testing of one or more communication devices is provided. The method may include capturing one or more recorded sequences of events in which at least one of the events corresponds to a detection of a touch input. The recorded sequences may correspond to at least one designated test. The method may further include enabling provision of the recorded sequences of events to one or more communication devices. The method may further include facilitating sending of one or more generated commands to at least one of the communication devices instructing the communication device to perform the recorded sequences.

In another example embodiment, an apparatus for facilitating automated testing of one or more communication devices is provided. The apparatus may include a processor and a memory including computer program code. The memory and computer program code are configured to, with the processor, cause the apparatus to at least perform operations including capturing one or more recorded sequences of events in which at least one of the events corresponds to a detection of a touch input. The recorded sequences may correspond to at least one designated test. The memory and computer program code are further configured to, with the processor, cause the apparatus to enable provision of the recorded sequences of events to one or more communication devices. The memory and computer program code are further configured to, with the processor, cause the apparatus to facilitate sending of one or more generated commands to at least one of the communication devices instructing the communication device to perform the recorded sequences.

In another example embodiment, a computer program product for facilitating automated testing of one or more communication devices is provided. The computer program product includes at least one computer-readable storage medium having computer-readable program code portions stored therein. The computer-executable program code instructions may include program code instructions configured to capture one or more recorded sequences of events in which at least one of the events corresponds to a detection of a touch input. The recorded sequences may correspond to at least one designated test. The program code instructions may also enable provision of the recorded sequences of events to one or more communication devices. The program code instructions may also facilitate sending of one or more generated commands to at least one of the communication devices instructing the communication device to perform the recorded sequences.

BRIEF DESCRIPTION OF THE SEVERAL VIEWS OF THE DRAWINGS

Figure 1:
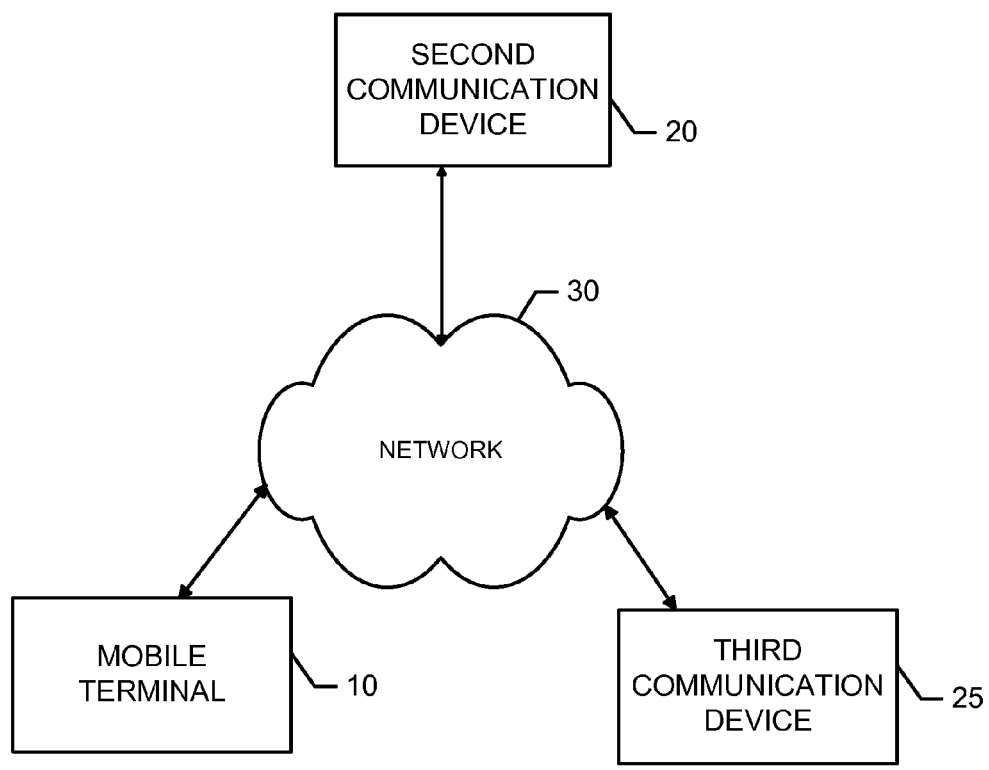
Figure 2:
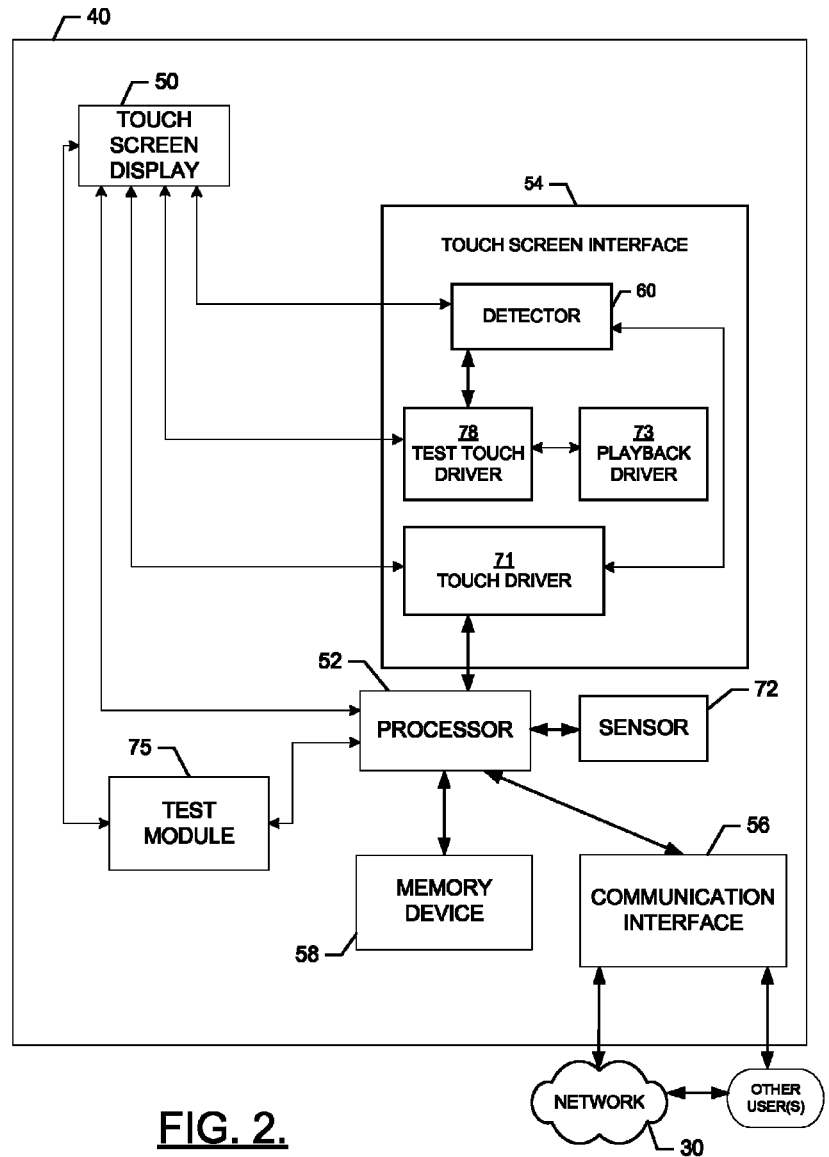
Figure 3:
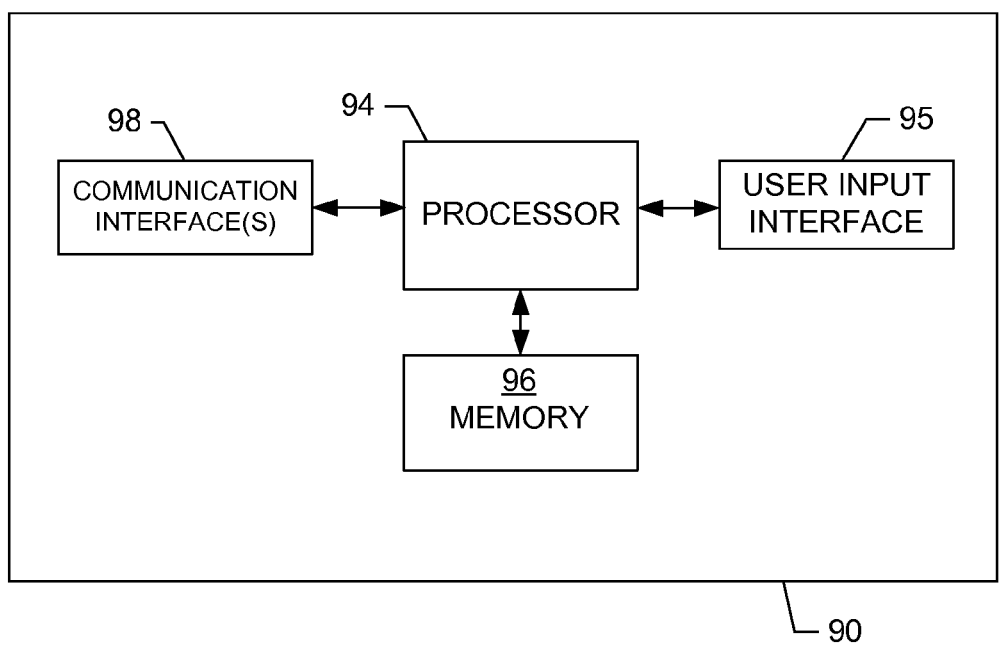
Figure 4:
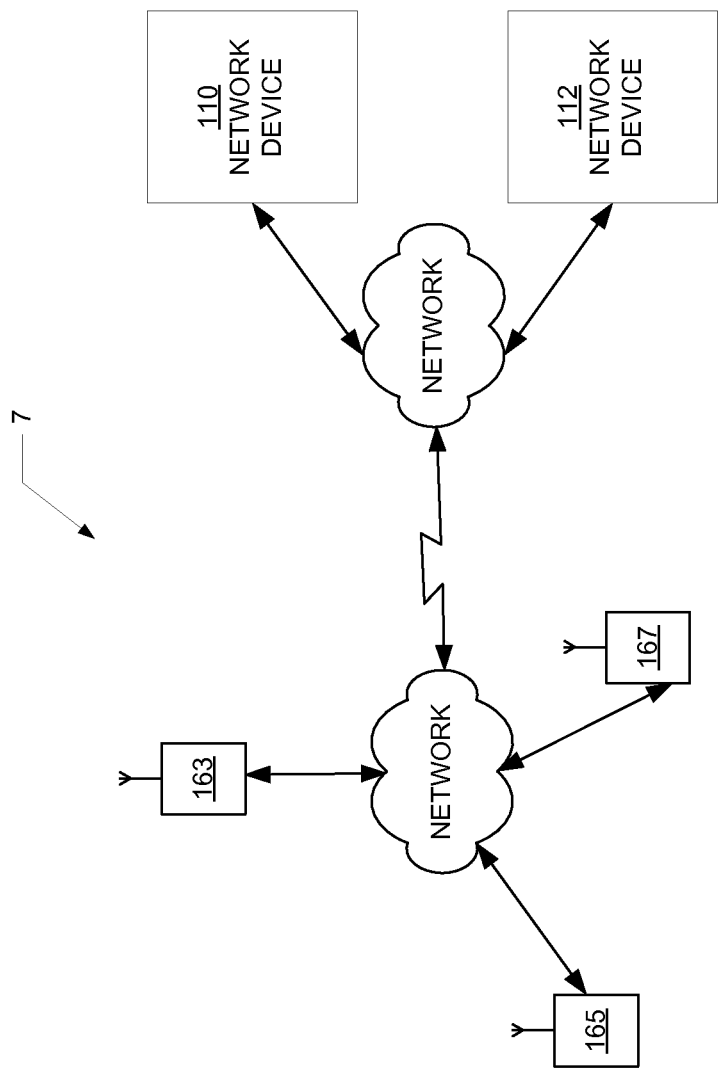
Figure 5:
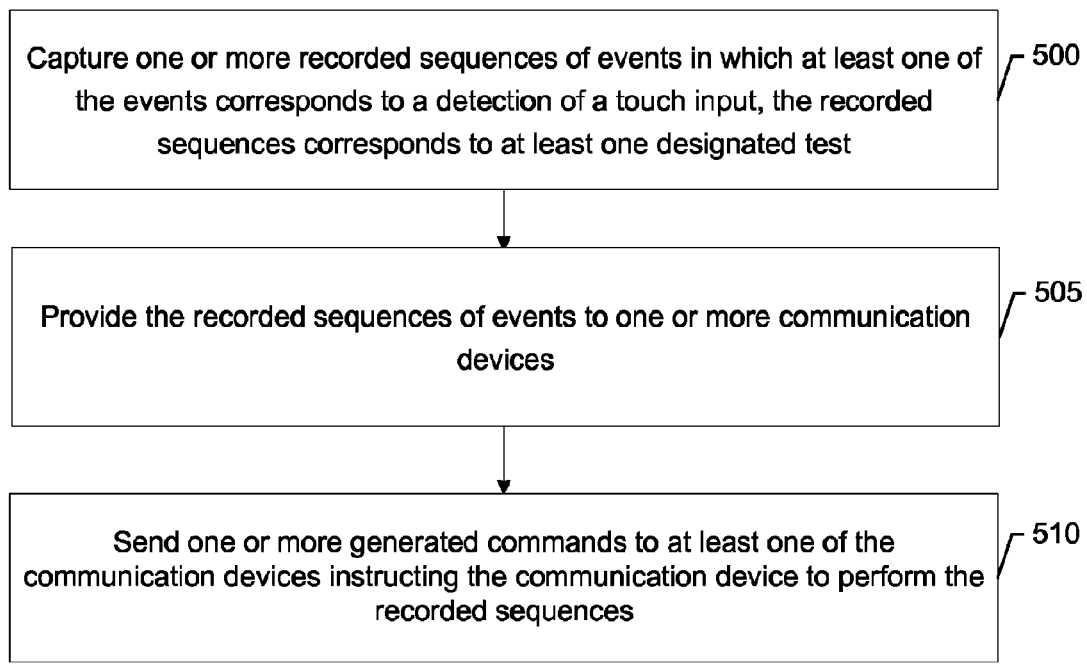

Having thus described the invention in general terms, reference will now be made to the accompanying drawings, which are not necessarily drawn to scale, and wherein:

FIG. 1 is a schematic block diagram of a system according to an example embodiment of the invention;

FIG. 2 is a schematic block diagram of an apparatus according to an example embodiment of the invention;

FIG. 3 is a schematic block diagram of a network device according to an example embodiment of the invention;

FIG. 4 is a block diagram of a system according to an example embodiment of the invention; and FIG. 5 illustrates a flowchart for facilitating automated testing of communication devices according to an example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

FIG. 1 illustrates a generic system diagram in which a device such as a mobile terminal 10 is shown in an example communication environment. As shown in FIG. 1, an embodiment of a system in accordance with an example embodiment of the invention may include a first communication device (e.g., mobile terminal 10) and a second communication device 20 capable of communication with each other via a network 30. In some cases, an embodiment of the present invention may further include one or more additional communication devices, one of which is depicted in FIG. 1 as a third communication device 25. In one embodiment, not all systems that employ an embodiment of the present invention may comprise all the devices illustrated and/or described herein. While an embodiment of the mobile terminal 10 and/ or second and third communication devices 20 and 25 may be illustrated and hereinafter described for purposes of example, other types of terminals, such as tablet computing devices, portable digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the present invention. Furthermore, devices that are not mobile, such as servers and personal computers may also readily employ an embodiment of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all-inclusive or detailed view of the system or the network 30. Although not necessary, in one embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE) or Evolved Universal Terrestrial Radio Access Network (E-UTRAN), Self Optimizing/Organizing Network (SON) intra-LTE, inter-Radio Access Technology (RAT) Network and/or the like. In one embodiment, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example one or more base stations (BS) that is a part of one or more cellular or mobile networks or one or more access points (APs) that may be coupled to a data network, such as a Local Area Network (LAN), Wireless Local Area Network (WLAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other. For example, the mobile terminal 10 and the second and third communication devices 20 and 25 as well as other devices may communicate according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, radio frequency (RF), near field communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first communication device (e.g., the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as personal computers (PCs) or laptop computers.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

In an example embodiment, the mobile terminal as well as the second and third communication devices 20 and 25 may employ an apparatus (e.g., apparatus of FIG. 2) capable of employing an embodiment of the invention.

Referring now to FIG. 2, an apparatus 40 may include or otherwise be in communication with a touch screen display 50, a processor 52, a touch screen interface 54, a communication interface 56, a memory device 58, a sensor 72, a detector 60, a test module 75, a touch driver 71, a playback driver 73 and a test touch driver 78. In one example embodiment, the playback driver 73 may be included or embodied in the test touch driver 78. The memory device 58 may be configured to store information, data, files, such as for example test files, applications, instructions or the like for enabling the apparatus to carry out various functions in accordance with an example embodiment of the invention. The test files may include a recorded sequence of events (e.g., touch events) for performing one or more tests on the apparatus 40 or other apparatuses 40. The test files may be pre-stored in memory device 58 or provided to memory device 58 from another device (e.g., network device 90 of FIG. 3, other apparatuses 40, etc.). The memory device 58 may include, for example, volatile and/or non-volatile memory. For example, the memory device 58 may be an electronic storage device (e.g., a computer readable storage medium) comprising gates configured to store data (e.g., bits) that may be retrievable by a machine (e.g., a computing device like processor 52). In an example embodiment, the memory device 58 may be a tangible memory device that is not transitory. The memory device 58 could be configured to buffer input data for processing by the processor 52. Additionally or alternatively, the memory device 58 could be configured to store instructions for execution by the processor 52. As yet another alternative, the memory device 58 may be one of a plurality of databases that store information and/or media content (e.g., pictures, images, videos, etc.).

The apparatus 40 may, in one embodiment, be a mobile terminal (e.g., mobile terminal 10) or a fixed communication device or computing device configured to employ an example embodiment of the invention. However, in one embodiment, the apparatus 40 may be embodied as a chip or chip set. In other words, the apparatus 40 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 40 may therefore, in some cases, be configured to implement an embodiment of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 52 may be embodied in a number of different ways. For example, the processor 52 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 52 may be configured to execute instructions stored in the memory device 58 or otherwise accessible to the processor 52. As such, whether configured by hardware or software methods, or by a combination thereof, the processor 52 may represent an entity (e.g., physically embodied in circuitry) capable of performing operations according to an embodiment of the invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the algorithms and operations described herein when the instructions are executed. However, in some cases, the processor 52 may be a processor of a specific device (e.g., a mobile terminal or network device) adapted for employing an embodiment of the invention by further configuration of the processor 52 by instructions for performing the algorithms and operations described herein. The processor 52 may include, among other things, a clock, an arithmetic logic unit (ALU) and logic gates configured to support operation of the processor 52.

In an example embodiment, the processor 52 may be configured to operate a connectivity program, such as a browser, Web browser or the like. In this regard, the connectivity program may enable the apparatus 40 to transmit and receive Web content, such as for example location-based content or any other suitable content, according to a Wireless Application Protocol (WAP), for example. It should be pointed out that the processor 52 may also be in communication with the touch screen display 50 and may instruct the display to illustrate any suitable information, data, content (e.g., media content) or the like.

Meanwhile, the communication interface 56 may be any means such as a device or circuitry embodied in either hardware, a computer program product, or a combination of hardware and software that is configured to receive and/or transmit data from/to a network and/or any other device or module in communication with the apparatus 40. In this regard, the communication interface 56 may include, for example, an antenna (or multiple antennas) and supporting hardware and/or software for enabling communications with a wireless communication network (e.g., network 30). In fixed environments, the communication interface 56 may alternatively or also support wired communication. As such, the communication interface 56 may include a communication modem and/or other hardware/software for supporting communication via cable, Digital Subscriber Line (DSL), Universal Serial Bus (USB), Ethernet, High-Definition Multimedia Interface (HDMI) or other mechanisms. Furthermore, the communication interface 56 may include hardware and/or software for supporting communication mechanisms such as Bluetooth, Infrared, Ultra-Wideband (UWB), WiFi and/or the like.

The touch screen display 50 may be configured to enable touch recognition by any suitable technique, such as resistive, capacitive, infrared, strain gauge, surface wave, optical imaging, dispersive signal technology, acoustic pulse recognition, or other like techniques. The touch screen interface 54 may be in communication with the touch screen display 50 to receive indications of user inputs at the touch screen display 50 and to modify a response to such indications based on corresponding user actions that may be inferred or otherwise determined responsive to the indications. In this regard, the touch screen interface 54 may be any device or means embodied in either hardware, software, or a combination of hardware and software configured to perform the respective functions associated with the touch screen interface 54 as described below. In an example embodiment, the touch screen interface 54 may be embodied in software as instructions that are stored in the memory device 58 and executed by the processor 52. Alternatively, the touch screen interface 54 may be embodied as the processor 52 configured to perform the functions of the touch screen interface 54. Additionally, in an example embodiment, a screen of the touch screen display 50 may be controlled by moving a finger, pointing device or the like on top of the screen surface of the touch screen display 50 without actually touching the screen and different gestures may be used to select one or more graphical elements (e.g., icons, an item(s) (e.g., a number, alphanumeric character, etc.) of a virtual keyboard).

The touch screen interface 54 may be configured to receive an indication of an input in the form of a touch event at the touch screen display 50. Following recognition of the touch event, the touch screen interface 54 may be configured to thereafter determine a stroke event or other input gesture and provide a corresponding indication on the touch screen display 50 based on the stroke event. In this regard, for example, the touch screen interface 54 may include a detector 60 to receive indications of user inputs in order to recognize and/or determine a touch event based on each input received at the detector 60. The detector 60 may communicate the received indications of user inputs to the touch driver 71 and/or the test touch driver 78, as described more fully below.

In an example embodiment, one or more sensors (e.g., sensor 72) may be in communication with the detector 60. The sensors may be any of various devices or modules configured to sense one or more conditions. In this regard, for example, a condition(s) that may be monitored by the sensor 72 may include pressure (e.g., an amount of pressure exerted by a touch event) and any other suitable parameters.

A touch event may be defined as a detection of an object, such as a stylus, finger, pen, pencil or any other pointing device, coming into contact with a portion of the touch screen display in a manner sufficient to register as a touch. In this regard, for example, a touch event could be a detection of pressure on the screen of touch screen display 50 above a particular pressure threshold over a given area. Subsequent to each touch event, the touch screen interface 54 (e.g., via the detector 60) may be further configured to recognize and/or determine a corresponding stroke event or input gesture. A stroke event (which may also be referred to as an input gesture) may be defined as a touch event followed immediately by motion of the object initiating the touch event while the object remains in contact with the touch screen display 50. In other words, the stroke event or input gesture may be defined by motion following a touch event thereby forming a continuous, moving touch event defining a moving series of instantaneous touch positions. The stroke event or input gesture may represent a series of unbroken touch events, or in some cases a combination of separate touch events. For purposes of the description above, the term immediately should not necessarily be understood to correspond to a temporal limitation. Rather, the term immediately, while it may generally correspond to relatively short time after the touch event in many instances, instead is indicative of no intervening actions between the touch event and the motion of the object defining the touch positions while such object remains in contact with the touch screen display 50. In this regard, it should be pointed out that no intervening actions cause operation or function of the touch screen. However, in some instances in which a touch event that is held for a threshold period of time triggers a corresponding function, the term immediately may also have a temporal component associated in that the motion of the object causing the touch event must occur before the expiration of the threshold period of time.

In an example embodiment, the detector 60 may be configured to communicate detection information regarding the recognition or detection of a stroke event or input gesture as well as a selection of one or more items of data (e.g., images, text, graphical elements, etc.) to the touch driver 71. The touch driver 71 may provide the information to the processor 52 for processing. In one embodiment, the touch driver 71 (along with the detector 60) may be a portion of the touch screen interface 54. The touch driver 71 may be embodied as any means such as a device or circuitry embodied in hardware, software (e.g., software instructions) or a combination of hardware and software that is configured to perform corresponding functions of the touch driver 71, as described herein.

In an example embodiment, the touch screen interface 54 may be embodied by a processor, controller of the like. Furthermore, the detector 60 may be embodied as any means such as a device or circuitry embodied in hardware, software or a combination of hardware and software that is configured to perform corresponding functions of the detector 60, as described herein.

The test module 75 may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the test module 75, as described herein. Thus, in an example in which software is employed, a device or circuitry (e.g., the processor 52 in one example) executing the software forms the structure associated with such means. In an example embodiment, the test module 75 may send one or more commands to the test touch driver 78 to record one or more sequences for one or more tests. The test module 75 may generate and send the commands to the test touch driver 78 in response to receipt of an indication of a selection by a user of the apparatus 40. Receipt of the one or more commands from the test module 75 may trigger the test touch driver 78 to enter a recording mode to record the sequence(s).

In some example embodiments, the test module 75 may also send one or more commands to the playback driver 73 to perform one or more recorded sequences in a file(s), as described below. The test module 75 may send the one or more commands to the playback driver 73 in response to receipt of an indication of a selection by a user of the apparatus 40.

In an example embodiment, the processor 52 may be embodied as, include or otherwise control the test touch driver 78. The test touch driver 78 may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or structure to perform the corresponding functions of the test touch driver 78 as described below. Thus, in an example in which software is employed, a device or circuitry (e.g., the processor 52 in one example) executing the software forms the structure associated with such means.

The test touch driver 78 may receive detection information regarding the recognition or detection of a stroke event or input gesture and/or selection of one or more items of data (e.g., images, text, graphical elements, etc.) from the detector 60. In this regard, the test touch driver 78 may be configured to determine the location (e.g., x coordinates, y coordinates associated with the location) or position of one or more touch events of the touch screen interface 54. As such, the touch driver 71 may register the position or location of the touch event(s) and may send this information to a controller or processor (e.g., processor 52) for processing. The test touch driver 78 may receive the detection information regarding one or more touch events being captured via the touch screen interface 54 in response to recording a sequence(s) of events to create one or more tests or test plans for operations of one or more apparatuses 40.

In this regard, for example, a user of the apparatus 40 may select the test module 75 and may designate to record one or more events (e.g., touch events) via the touch screen interface 54. As such, the test module 75 may send one or more commands to the test touch driver 78 to record one or more sequences of events (e.g., touch events). In response to receipt of the commands from the test module 75 to record the one or more sequence of events, the test touch driver 78 and/or the processor 52 may unload the touch driver 71. However, the touch driver 71 may still perform functions (e.g., unrelated input gestures, etc.) associated with the touch screen interface 54 that are not necessarily associated with or tied to the recording of the sequence of events even while the recording is being performed.

In response to receipt of the commands from the test module 75, the test touch driver 78 may record one or more sequence of events or operations being performed in response to touch events of the user of the apparatus 40 being captured. The test touch driver 78 may also capture or record the time in between touch events (e.g., the time needed to move from a currently selected item of the touch screen interface 54 to a next item of the touch screen interface 54 for selection by the user). The test touch driver 78 may save the recorded sequence(s), and the time in between touch events, in one or more files. The test touch driver 78 may store the saved files in memory device 58. The saved recorded sequence(s) of the files may be provided to one or more other apparatuses 40 to instruct (e.g., via one or more commands) a playback driver (e.g., playback driver 73) of the apparatuses 40 to perform the recorded sequence(s) in an automated manner to determine whether the apparatuses 40 operate properly in response to performing the recorded sequence(s) (also referred to herein as tests).

In addition to the playback driver 73 of apparatuses 40 receiving commands to play or perform the recorded sequence(s), in some instances the playback driver 73 may receive commands (e.g., from another apparatus 40 or network device (e.g., network device 90 of FIG. 3)) to deactivate or stop the playing of the sequence of events recorded in a particular file(s). In an instance in which the playback driver 73 performs the recorded sequence(s) to completion and reaches the end of file, the playback driver 73 may wait for a next command prior to taking any further action(s). In an instance in which playback driver 73 receives instructions to perform a recorded sequence(s) of a file, the processor 52 may unload the touch driver 71 and may load the playback driver 73 to perform the recorded sequence(s).

In an example embodiment, the recorded sequences may be designated for apparatuses 40 having touch screen displays 50 with a size that is substantially the same as the size of the touch screen display 50 of the apparatus 40 that utilized the test touch driver 78 to record the sequence(s) of events. Additionally or alternatively, the recorded sequences may be designated for apparatuses 40 that include touch drivers 71 of a same type as the touch driver of the apparatus 40 that utilized the test touch driver 78 to create the recorded sequence(s) of events. In this regard, in an example embodiment, a user (e.g., tester) may record sequences for each apparatus 40 having substantially the same size of a touch screen display and which utilize the same type of touch driver 71.

For purposes of illustration and not of limitation, consider an instance in which a user of the apparatus 40 desires to create a test for calling five telephone numbers a number of times totaling 10,000 calls. In this regard, the user may make a selection or input data via the test module 75 specifying this test. In response to the test touch driver 78 receiving an indication (e.g., commands) from the test module 75 identifying the test, the test touch driver 78 may record the touch events (e.g., dialing the telephone numbers, etc.) as well as the time in between the captured touch events associated with the user utilizing the apparatus 40 to initiate the phone calls to the five telephone numbers. Responsive to recording the sequence(s) associated with calling the five telephone numbers, the test touch driver 78 may save the recorded sequence(s) in a file(s) which may be stored in memory device 58. The recorded sequence(s) may include data specifying to the call the five numbers according to the recorded sequence(s) for a total of 10,000 calls. The test touch driver 78 and/or the processor 52 may provide the file(s) with this recorded sequence(s) to one or more other apparatuses 40 and may instruct the playback driver (e.g., playback driver 73) of the other apparatuses 40 to play or perform the recorded sequence(s) of the file(s) to call the five numbers for a total of 10,000 calls. In this example, the calling of the five telephone numbers for a total of 10,000 calls may be for reliability testing of the other apparatuses 40. Although the above example relates to a recorded sequence(s) for calling five telephone numbers for a total of 10,000 calls, a recorded sequence(s) may be captured by the test touch driver 78 for any suitable operations of the apparatus 40, including but not limited to making text messages (also referred to herein as SMS messages), Multimedia Messaging Service, (MMS) messages, accessing data from the Internet, playing a video(s), playing music, etc.

Referring now to FIG. 3, a block diagram of one example of a network device is provided. As shown in FIG. 3, the network device (e.g., a server (e.g., communication device 20)) may include a processor 94 and an associated memory 96. The memory 96 may comprise volatile and/or non-volatile memory, and may store content, data, files (e.g., files including one or more recorded sequences) and/or the like. For example, the memory may store content, data, information, and/or the like transmitted from, and/or received by, the network device. Also for example, the memory 96 may store client applications, instructions, and/or the like for the processor 94 to perform the various operations of the network device in accordance with an embodiment of the invention, as described herein.

In addition to the memory 96, the processor 94 may also be connected to at least one interface or other means for displaying, transmitting and/or receiving data, content, and/or the like. In this regard, the interface(s) may comprise at least one communication interface 98 or other means for transmitting and/or receiving data, content, and/or the like, as well as at least one user input interface 95. The user input interface 95, in turn, may comprise any of a number of devices allowing the network device to receive data from a user, such as a keypad, a touch display, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

In an example embodiment, the processor 94 may be embodied in hardware or a combination of hardware and software (e.g., processor 94 operating under software control, the processor 94 embodied as an ASIC or FPGA specifically configured to perform the operations described herein, or a combination thereof.

The network device 90 may send one or more files of a recorded sequence(s) to one or more apparatuses 40. The recorded sequence(s) may be captured by a test touch driver (e.g., test touch driver 78) of an apparatus 40 and provided to the network device 90 to enable the network device 90 to send one or more files including one or more corresponding recorded sequences to one or more apparatuses 40. In this manner, the apparatuses 40 receiving the files (e.g., test files) from the network device 90 may perform the recorded sequence(s) of the files.

In one example embodiment, one or more of the apparatuses 40 may play or perform the recorded sequence(s) of a file in response to receiving one or more commands or instructions from the processor 94 of the network device 90 to play/perform the recorded sequence(s). In this regard, one or more of the apparatuses 40 may send results of the played or performed recorded sequences to the network device 90.

In an example embodiment, the processor 94 of the network device 90 may edit a recorded sequence(s) of a file(s) prior to sending the file(s) to one or more apparatuses 40. For example, in response to the processor 94 receiving an indication of an input from a user to alter a recorded sequence(s) of a file(s), the processor 94 may edit the recorded sequence(s) based in part on the instructions of the user. In this regard, for example, the processor 94 of the network device 90 may adjust/edit the time (e.g., adjusting a time from 0.3 ms to 0.2 ms) in between touch events (e.g., a time between a first touch and a second touch of the touch screen interface 54, etc.). Additionally, the processor 94 of the network device 90 may edit one or more recorded sequences by moving or rearranging the sequences of a file(s) or may edit the recorded sequences of the corresponding files in any other suitable manner.

Additionally, processor 94 of the network device 90 may edit a complete recorded sequence(s) by analyzing individual segments of the recorded sequence(s) and storing each segment as a separate file. The separate files may then be written to a memory (e.g., memory 96). In an example embodiment, the separate files may be written to a file system of the memory. The segments may be editable by the processor 94 such that a segment(s) may be copied and used as the base of another recorded sequence(s). In this regard, for example, the processor 94 may change a uniform resource locator (URL) of a webpage in a copied segment or a delay time between events (e.g., touch events) or any other suitable information of a segment. In one example embodiment, the segments may be edited in a format such as, for example, Extensible Markup Language (XML). However, the segments may be edited in other formats without departing from the spirit and scope of the invention. Additionally, the processor 52 of an apparatus 40 may edit segments of sequences of recorded sequences in a manner analogous to that of processor 94 of network device 90.

In one example embodiment, the processor 94 of the network device 90 may arrange or group a sequence of files, which includes recorded sequences, to be played or performed by apparatuses 40. For purposes of illustration and not of limitation, consider an example in which the memory 96 stores files A, B, C and D and in which each file includes one or more recorded sequences. The processor 94 of the network device 90 may generate a grouping of these files to be played/performed based on a designated order of files such as, for example, performing file C first, performing file D second, performing file A third and performing file B fourth. In this regard, the grouping of files may be sent by the processor 94 of the network device 90 to one or more apparatuses 40 with commands/instructions requesting a playback driver (e.g., playback driver 73) of the apparatuses 40 to perform the recorded sequences of the grouped files according to the designated order of the files.

Referring now to FIG. 4, a system according to an example embodiment is provided. Although the system 7 of the example embodiment of FIG. 4 shows two network devices 110, 112 (e.g., network devices 90) and three communication devices 163, 165, 167 (e.g., apparatuses 40), system 7 may include any suitable number of network devices 110, 112 and communication devices 163, 165, 167 without departing from the spirit and scope of the invention.

In an example embodiment of the system 7 of FIG. 4, one or more of the network devices 110, 112 may send one or more test files, having one or more recorded sequences, to one or more of the communication devices 163, 165 and 167. In this regard, a playback driver (e.g., playback driver 73) of the communication devices (e.g., communication devices 163, 165) receiving the one or more test files may perform one or more of the recorded sequences of the test files.

The communication devices (e.g., communication devices 163, 165) receiving the test files may, but need not provide data to the one or more of the network devices 110, 112 indicating results of the performed recorded sequences. In this manner, a processor (e.g., processor 94) of the network devices 110, 112 may determine whether the devices are operating properly and passing the tests.

As described above, the test files stored by one or more network devices such as, for example, network devices 110, 112 may be received from a communication device(s) (e.g., communication device 167) in response to the communication device(s) recording a sequence of events (e.g., touch events). For purposes of illustration and not of limitation, as an example, a tester or user of a communication device (e.g., communication device 167 (e.g., apparatus 40)) may utilize the communication device to trigger the test touch driver (e.g., test touch driver 78) to record a complete sequence including (1) navigation to a phonebook, (2) the selection of a phone number from the phone book, and (3) the placing of a 1 minute call. The test touch driver may save steps 1-3 to a file(s) that may be stored in a memory (e.g., memory device 58). In this example, the test may end upon the expiration of the 1 minute call. In other words, the call may be ended after 1 minute and the test may be complete. In another alternative example embodiment, the recorded completed sequence may include a step (4) for termination of the call. In this regard, the duration of the call may be indefinite and may not be terminated until a network device (e.g., network device 110) sends a command to a corresponding communication device(s) to terminate the call.

The communication device (e.g., communication device 167) may send or provide the file(s) including the recorded sequence to one or more of the network devices 110, 112. In this regard, one or more of the network devices 110, 112 may send the test file(s) to one or more communication devices (e.g., communication devices 163, 165) and may instruct the one or more communication devices (e.g., communication devices 163, 165) to play/perform (e.g., via a playback driver) the recorded sequence of the test file(s).

One or more of the network devices 110, 112 may monitor the manner in which one or more communication devices (e.g., communication devices 163, 165, 167) are operating during the performance of a recorded sequence(s). In this regard, one or more of the network devices 110, 112 may receive diagnostic data and measurements from the communication devices regarding the manner in which the communication devices are operating/behaving during the performance of the recorded sequence(s) of a file(s) (e.g., test file(s)). In this regard, the network devices 110, 112 may analyze the diagnostic data and measurements to determine whether the communication devices are behaving properly during the performance of a recorded sequence and may take one or corrective actions. An example of a corrective action(s) may include, but is not limited to, the network devices 110, 112 sending one or more commands to a corresponding communication device(s) to restart the performance of the recorded sequence(s).

During an instance in which a communication device (e.g., communication device 165) performs a recorded sequence(s) of a file(s), a network device (e.g., network device 110) may perform other tasks on behalf of the communication device including, but not limited to, hand offs, network switches (e.g., from a 3G network to a 2G network to a LTE network) and any other suitable tasks or operations.

Referring now to FIG. 5, a flowchart of an example method for automating testing on touch communication devices is provided. At operation 500, an apparatus (e.g., apparatus 40) may include means such as the processor 52, the detector 60, the test touch driver 78 and/or the like, for capturing one or more recorded sequences of events in which at least one of the events corresponds to a detection of a touch input (e.g., via touch screen interface 54). The recorded sequences may correspond to at least one designated test (e.g., a test for performing a call, SMS message, MMS message, playing a video(s), playing music, etc.). At operation 505, the apparatus (e.g., apparatus 40) may include means such as the processor 52, the test touch driver 78 and/or the like, for providing the recorded sequences of events to one or more communication devices (e.g., other apparatuses 40, a network device (e.g., network device 90)). At operation 510, the apparatus (e.g., apparatus 40) may include means such as the processor 52, the test touch driver 78 and/or the like, for sending of one or more generated commands to at least one of the communication devices instructing the communication device to perform the recorded sequences.

It should be pointed out that FIG. 5 is a flowchart of a system, method and computer program product according to an example embodiment of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 58, memory 96) and executed by a processor (e.g., processor 52, processor 94). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In an example embodiment, an apparatus for performing the method of FIG. 5 above may comprise a processor (e.g., the processor 52, the processor 94) configured to perform some or each of the operations (500-510) described above. The processor may, for example, be configured to perform the operations (500-510) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (500-510) may comprise, for example, the processor 52 (e.g., as means for performing any of the operations described above), the processor 94 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    capturing, via a processor of an apparatus, one or more recorded sequences of events in which at least one of the events corresponds to a detection of a touch input, the recorded sequences correspond to at least one designated test;
    enabling provision of the recorded sequences of events to one or more communication devices; and
    facilitating sending of one or more generated commands to at least one of the communication devices instructing the communication device to perform the recorded sequences.

2. The method of claim 1, further comprising:
    including the recorded sequence of events in one or more corresponding files.

3. The method of claim 1, wherein instructing further comprises instructing a playback driver of the communication devices to perform the recorded sequences.

4. The method of claim 1, wherein capturing the recorded sequence of events further comprises recording a time between at least two of the events of corresponding touch inputs.

5. The method of claim 1, wherein:
    the detection of the touch input is captured on or above a touch interface; and
    the recorded sequence of events are designated for performance on a type of the communication devices.

6. The method of claim 5, wherein capturing the recorded sequence of events comprises unloading a touch driver associated with the touch interface and loading a test touch driver.

7. The method of claim 1, further comprising:
    automatically performing the recorded sequences of events in response to receipt of an indication instructing to play at least one of the recorded sequences.

8. The method of claim 1, further comprising:
    receiving one or more edits to the recorded sequences of events altering data of at least one segment of the recorded sequences which alters the test.

9. The method of claim 2, further comprising:
    receiving one or more instructions to perform a subset of the recorded sequences of events of the files according to a designated order of the files.

10. An apparatus comprising
    at least one processor; and
    at least one memory including computer program code configured to, with the at least one processor, cause the apparatus to perform at least the following:
    capture one or more recorded sequences of events in which at least one of the events corresponds to a detection of a touch input, the recorded sequences correspond to at least one designated test;
    enable provision of the recorded sequences of events to one or more communication devices; and
    facilitate sending of one or more generated commands to at least one of the communication devices to instruct the communication device to perform the recorded sequences.

11. The apparatus of claim 10, wherein the memory and computer program code are configured to, with the processor, cause the apparatus to:
    include the recorded sequence of events in one or more corresponding files.

12. The apparatus of claim 10, wherein the memory and computer program code are configured to, with the processor, cause the apparatus to:
    instruct the communication devices by instructing a playback driver of the communication devices to perform the recorded sequences.

13. The apparatus of claim 10, wherein the memory and computer program code are configured to, with the processor, cause the apparatus to:
    capture the recorded sequence of events by recording a time between at least two of the events of corresponding touch inputs.

14. The apparatus of claim 10, wherein:
the detection of the touch input is captured on or above a touch interface; and
the recorded sequence of events are designated for performance on a type of the communication devices.

15. The apparatus of claim 14, wherein the memory and computer program code are configured to, with the processor, cause the apparatus to:
capture the recorded sequence of events by unloading a touch driver associated with the touch interface and loading a test touch driver.

16. The method of claim 10, wherein the memory and computer program code are configured to, with the processor, cause the apparatus to:
automatically perform the recorded sequences of events in response to receipt of an indication instructing to play at least one of the recorded sequences.

17. The apparatus of claim 10, wherein the memory and computer program code are configured to, with the processor, cause the apparatus to:
receive one or more edits to the recorded sequences of events altering data of at least one segment of the recorded sequences which alters the test.

18. The apparatus of claim 11, wherein the memory and computer program code are configured to, with the processor, cause the apparatus to:
receive one or more instructions to perform a subset of the recorded sequences of events of the files according to a designated order of the files.

19. A computer program product comprising at least one non-transitory computer-readable storage medium having computer-readable program code portions stored therein, the computer-readable program code portions comprising:
program code instructions configured to capture, via an apparatus, one or more recorded sequences of events in which at least one of the events corresponds to a detection of a touch input, the recorded sequences correspond to at least one designated test;
program code instructions configured to enable provision of the recorded sequences of events to one or more communication devices; and
program code instructions configured to facilitate sending of one or more generated commands to at least one of the communication devices to instruct the communication device to perform the recorded sequences.

20. The computer program product of claim 19, further comprising:
program code instructions configured to instruct the communication devices by instructing a playback driver of the communication devices to perform the recorded sequences.

* * * * *